3,379,657
PROCESS FOR THE PRODUCTION OF FOAM PLASTIC USING THIOGLYCOLIC ACID-S-CARBOXYLIC ACID ANHYDRIDE
Karl Hamann, Stuttgart, and Franz Stürzenhofecker, Marl, Germany, assignors to Chemische Werke Huls Aktiengesellschaft, Marl, Kreis Recklinghausen, Germany, a corporation of Germany
No Drawing. Filed Sept. 28, 1964, Ser. No. 399,877
Claims priority, application Germany, Oct. 3, 1963, C 31,044
1 Claim. (Cl. 260—2.5)

ABSTRACT OF THE DISCLOSURE

This invention relates to the preparation of foam plastics by the reaction of thioglycolic acid-S-carboxylic acid anhydride having the formula

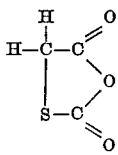

with a multi-ethylenically unsaturated compound and a polyol.

It is known that thioglycolic acid esters can be made from thioglycolic acid-S-carboxylic acid anhydride, a compound having the structural formula

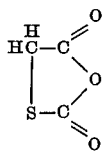

and alcohols by splitting out carbon dioxide. It is further known that mercaptan can be added to unsaturated compounds.

It has now been found that foam plastics can be made advantageously by reacting thioglycolic acid-S-carboxylic acid anhydride with multiunsaturated compounds and polyols, at least one of which contains at least three functional groups. By functional group we mean the C=C-double bond in the case of unsaturated compounds and the HO-group in the case of the polyols.

The term multiunsaturated compounds embraces polymers and copolymers of e.g. butadiene or isoprene; unsaturated polyesters which contain unsaturated acids such as itaconic acid, tetrahydrophthalic acid, dihydrophthalic acid, endomethylenetetrahydrophthalic acid, dicarboxylic acids produced by the En-synthesis from olefines with maleic acid anhydride or unsaturated polyols such as 2-butendiol-(1,4), pentaerythrite mono- or diallyl ether, glycerine monoallyl ether and 1,1-dimethylol-cyclohexene-(3); polymers or copolymers having unsaturated side groups such as polymers or copolymers of the above mentioned unsaturated acids which have been partially or completely esterified with unsaturated alcohols or polyalcohols which have been esterified with unsaturated acids or etherified with unsaturated alcohols. Examples are the partial allyl ester of maleic acid-olefine copolymers or of acrylic acid polymers or copolymers, the partial methacrylic acid ester of cellulose, the partial allyl ether of cellulose, polyvinyl alcohol esterified with crotonic acid, vinylene carbonate copolymer esterified with endomethylenetetrahydrobenzoic acid, prepolymers of diallylphthalate, dichlorodiallyl-oxyethylene carbonate or diethyleneglycol-[bis-allyl carbonate]; low molecular weight multiunsaturated compounds such as multiunsaturated acids, alcohols, ethers, esters, acetals, amides and amines e.g. the allyl esters of maleic acid, fumaric acid, itaconic acid, hemimellitic acid, pyromellitic acid, citronellic acid, 1,3,5-triacryloyl-perhydrotriazine, acrylic or methacrylic esters of trimethylol-propane or ethane, the pentaerythrites, sorbites etc., unsaturated fats and oils, triallylamine, triallylphosphate or -phosphite, diallyl- or dicrotyl ester of unsaturated phosphonic or phosphinic acids or such other multiunsaturated compounds as cyclododecatriene, trivinylcyclohexane, trivinylbenzene, cyclooctatetraene, polyallyl- or methallyltrimethylenetrisulfone, polyallylsilane or -siloxane, and bis-allylidene-pentaerythrite. Also singly or doubly unsaturated compounds such as styrene, divinylbenzene, vinylcyclohexene, acrylic- and methacrylic esters of alcohols or glycols, allyl-, methallyl-, and crotyl esters of mono- or dicarboxylic acids and diallylether may be added when a polyhydroxyoxy compounds having at least three hydroxyl groups is used as second component.

Suitable polyols are for example trimethylolpropane or -ethane, pentaerythrite, sorbite, saponified vinylester polymers and copolymers hydroxyl group containing polyepoxides, polyacetals, polyesters, polyethers, and formaldehyde resins, polyacrolein, epoxidized and hydrated polydiolefines, oxyethylated cellulose, oxyethylated polymers and copolymers of acrylic acid, methacrylic acid, crotonic acid, itaconic acid, fumaric acid, polymers or copolymers of unsaturated hydroxyesters or amides as from propylene-glycolmonoacrylate, glycerine monoacrylate or n-methylolacrylamide. Further also bishydroxy compounds such as glycols or polyethylene oxide can be added when the first component contains at least three double bonds.

By the choice of suitable combinations or by variation of the ratio, the specific properties of the product is determined. A linear polycondensate without cross linking is obtained from a mixture of 1 mol of a doubly unsaturated compound, 1 mol of a bis-hydroxy compound and 2 mols of thioglycolic acid-S-carboxylic acid anhydride. By variation of the ratio only the molecular weight of the linear polycondensate can be influenced.

For the production of cross linked foam plastics unsaturated compounds having at least 3 double bonds per molecule and/or hydroxyl groups containing compounds having at least 3 hydroxyl groups per molecule are used. The process suitably may be carried out in such a way that there is one hydroxyl group for each double bond of the unsaturated component. However an excess of one or the other component may be used. The thio glycolic acid-S-carboxylic acid anhydride is used in an amount approximately equivalent to the hydroxyl groups.

For the production of foam plastics generally the three components are simply mixed together. In the case of components that are difficult to mix a solvent or solvent mixture may be used such as aliphatic or aromatic hydrocarbons, chlorohydrocarbons, esters and ethers. Catalysts in amounts from 0.1 to 10% may be used for promoting the reaction. Suitable catalysts are e.g. radical formers such as peroxide, hydroperoxide and azo compounds. In many instances acid or basic catalysts such as p-toluene sulfonic acid and its salts or piperidine are effective. Thus the allyl compounds of thioglycolic acid ester react especially readily under acid conditions while basic catalyst are favorable for e.g. acrylic compounds.

The production and hardening of foam plastics takes place generally at temperatures within the range from 0 to 300° C. and especially from 50 to 250° C. To improve the foaming it may be advantageous to work under a low pressure e.g. 1–3 atmospheres. Coloring materials, fillers, foam stabilizers, softeners and other materials may be added to increase the value of the polycondensates.

Example 1

10.5 g. of a maleic acid-ethyleneglycol polyester having an acid number of 46 was mixed at temperatures between 55–65° C. with 0.3 g. of p-toluene sulfonic acid and 2.68 g. of 1,1,1-trimethylolpropane. Then 7.1 g. of thioglycolic acid-S-carboxylic acid anhydride and 6 drops of 25% diacetylperoxide solution were added and the mixture stirred. The mixture began to foam due to the evolution of $CO_2$. The plastic was hardened within 10 minutes in an oil bath at 80–120° C. The product was a white, soft, foam plastic.

Example 2

12.72 g. of 2,2-dimethylpropylene-(1,3)-bis-acrylate was mixed with 2.72 g. of pentaerythrite and 0.3 g. of p-toluene sulfonic acid at 65° C. Then 7.1 g. of thioglycolic acid-S-carboxylic acid anhydride and 5 drops of 25% diacetylperoxide solution were added, stirred and heated to 80–100° C. $CO_2$ was liberated. In a short time a white, hard foam plastic was formed.

Example 3

An ethylene-maleic acid anhydride copolymer having a K-value of 37.6 (measured in a 1% solution in dimethylformamide) was esterified with allyl alcohol to a degree of 83%. 10 g. of the esterified copolymer was mixed with 3.68 g. of diethyleneglycol and 0.14 g. of p-toluene sulfonic acid at 55° C. After cooling to 30° C., 9.45 g. of thioglycolic acid-S-carboxylic acid anhydride and 6 drops of diacetylperoxide were added and the mixture was stirred for 15 minutes. Finally the mixture was heated quickly to 100° C. This resulted in the evolution of $CO_2$ and the formation of a slightly colored elastic foam plastic.

Example 4

An ethylene-maleic acid anhydride copolymer having a K-value of 37.6 was esterified to a degree of 74% with allyl alcohol. 10 g. of the esterified copolymer, 7.75 g. of diallylphthalate, 6.7 g. of trimethylolpropane and 0.6 g. of p-toluene sulfonic acid were mixed at 100° C. After stirring in 11.24 g. of thioglycolic-acid-S-carboxylic acid anhydride at 140–150° C. a light brown colored, highly elastic foam plastic was formed.

Example 5

10 g. of the esterified copolymer of Example 4 was stirred with 8.15 g. of bis-allyl glycidylfumarate, 14.98 g. of trimethylolpropane and 0.18 g. of p-toluene sulfonic acid at 100–110° C. Then 12.48 g. of thioglycolic acid-S-carboxylic acid anhydride and 0.42 g. of p-toluene sulfonic acid were stirred in and the mixture heated to 160–180° C. In a few minutes a slightly brown colored, elastic foam plastic was formed.

Example 6

10.5 g. of a maleic acid-ethylene-glycol polyester having an acid number of 46 was mixed with a brief heating with 0.5 g. of cellulose-acetobutyrate and 3.55 g. of 1,6-hexane diol. Then 7.1 g. of thioglycolic acid-S-carboxylic acid ester and 6–8 drops of a 25% solution of diacetylperoxide were added and the mixture well stirred. The foaming and hardening followed within 10 minutes at 50–70° C. The product was a very fine-pored, elastic, white foam plastic.

Example 7

5.4 g. of polybutadiene (viscosity 2360 cp. at 50° C.; iodine number 453; 1,4-cis-component-79%; 1,4-trans-component 20%; 1,2-component-1%) was mixed with 5 g. of the polyallylester of Example 4, 3.8 g. of diallylphthalate, 6.7 g. of 1,1,1-trimethylolpropane and 0.4 g. of p-toluene sulfonic acid at 100° C. At 60° C. 17.8 g. of thioglycolic acid-S-carboxylic acid anhydride was stirred into the mixture. After the addition of 6–8 drops of a 25% solution of diacetylperoxide the resulting mixture was foamed and hardened at 30–60° C. The product was a highly elastic foam plastic having a density of 0.08 g./ccm.

Example 8

10.8 g. of polybutadiene (reduced specific viscosity 1.3 as determined on a 0.5% solution in p-xylene at 100° C.; iodine number 462; 1,4-cis-component 89%; 1,4-trans component 10%; 1,2-component 1%) was mixed at 100° C. with 5 g. of the polyallylester of Example 4, 3.8 g. of diallylphthalate, 11.1 g. of 1,1,1-trimethylolpropane and 1.2 g. of p-toluene sulfonic acid at 60° C., 29 g. of thioglycolic acid-S-carboxylic acid anhydride was stirred in. The mixture was thus cooled to about 30° C. After the addition of 12–14 drops of a 25% solution of diacetylperoxide the mixture was foamed and hardened at 30 to 60° C. The product was a highly elastic foam plastic having a density of 0.13 g./ccm.

Example 9

5.4 g. of polybutadiene (reduced specific viscosity 1.3 as determined in a 0.5% solution in p-xylene at 110° C.; iodine number 462; 1,4-cis component 89%; 1,4-trans component 10%; 1,2-component 1%) was mixed at 80° C. with 3.55 g. of 1,6-hexane diol and 0.4 g. of p-toluene sulfonic acid. After cooling to 30° C. 11.8 g. of thioglycolic acid-S-carboxylic acid anhydride was added and intensively stirred in. After the addition of 6–8 drops of diacetylperoxide the viscous mass foamed with slight self heating to an elastic foam plastic.

We claim:
1. Process for the production of foam plastics which comprises reacting a mixture consisting essentially of (a) a thioglycolic acid-S-carboxylic acid anhydride, and (b) a multi ethylenically unsaturated compound and (c) a polyol at least one of which multi ethylenically unsaturated compounds and polyols contains at least three functional groups selected from the group consisting of —C=C— double bonds, hydroxyl groups and combinations thereof.

References Cited

UNITED STATES PATENTS

| | | | |
|---|---|---|---|
| 2,527,374 | 10/1950 | Patrick et al. | 260—77 |
| 2,964,502 | 12/1960 | Wheelock | 260—79 |
| 2,988,532 | 6/1961 | Nischk et al. | 260—79 |
| 3,278,496 | 10/1966 | La Fave et al. | 260—79 |
| 3,282,960 | 11/1966 | Broderick et al. | 260—327 |

MURRAY TILLMAN, *Primary Examiner.*

S. H. BLECH, *Examiner.*

J. T. GOOLKASIAN, *Assistant Examiner.*